United States Patent [19]
Bentley

[11] Patent Number: 6,068,232
[45] Date of Patent: May 30, 2000

[54] REMOVABLE SUPPORT STRUT FOR FOLDABLE SPORTS UTILITY VEHICLE SEAT

[76] Inventor: James K. Bentley, 2489 Starling Dr., Paso Robles, Calif. 93447

[21] Appl. No.: 09/200,559

[22] Filed: Nov. 27, 1998

[51] Int. Cl.[7] .................................................. A47B 97/00
[52] U.S. Cl. .................... 248/503.1; 248/301; 296/65.16
[58] Field of Search ............................... 248/503.1, 301, 248/304, 225.21, 227.1; 296/65.16, 65.09; 297/341, 22, 130

[56] References Cited

U.S. PATENT DOCUMENTS

| | | | |
|---|---|---|---|
| 5,562,322 | 10/1996 | Christoffel | 248/503.1 X |
| 5,634,686 | 6/1997 | Okasaki | 296/65.1 X |
| 5,662,368 | 9/1997 | Ito et al. | 296/65.1 |
| 5,873,629 | 2/1999 | Schuler | 297/341 |
| 5,910,351 | 6/1999 | Davis et al. | 248/301 X |

Primary Examiner—Ramon O. Ramirez
Attorney, Agent, or Firm—Charles C. Logan II

[57] ABSTRACT

A removable support strut for bracing the rear seat of a sports utility vehicle when the seat is tilted vertically. The elongated strut member has a seat anchor slot formed in its top edge adjacent its rear end. During installation of the strut member, the seat anchor slot is passed downwardly over a seat anchor rod mounted in the floor of the cargo space of the sports utility vehicle. The front end of the strut member is then rotated forwardly approximately 90 degrees at which time the contoured bottom edge of the strut member mates with the various wall surfaces of the recess that surrounds the access opening for the seat anchor rod. A latch slot is formed in the bottom edge of the support strut member adjacent its front end and a latch assembly is mounted adjacent thereto. The latch slot travels over a transversely extending tie-rod between the two pivot assemblies of the rear seat and is locked in position to prevent the folded seat from pivoting rearwardly and injuring someone or damaging items placed in the cargo storage floor area.

6 Claims, 2 Drawing Sheets

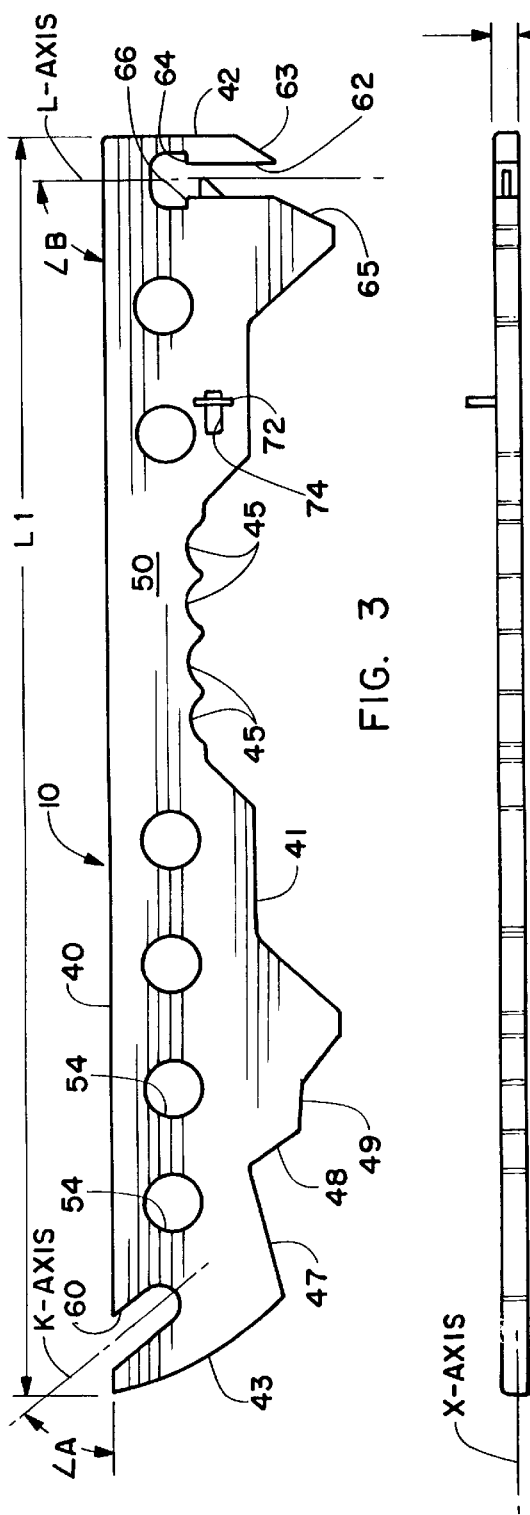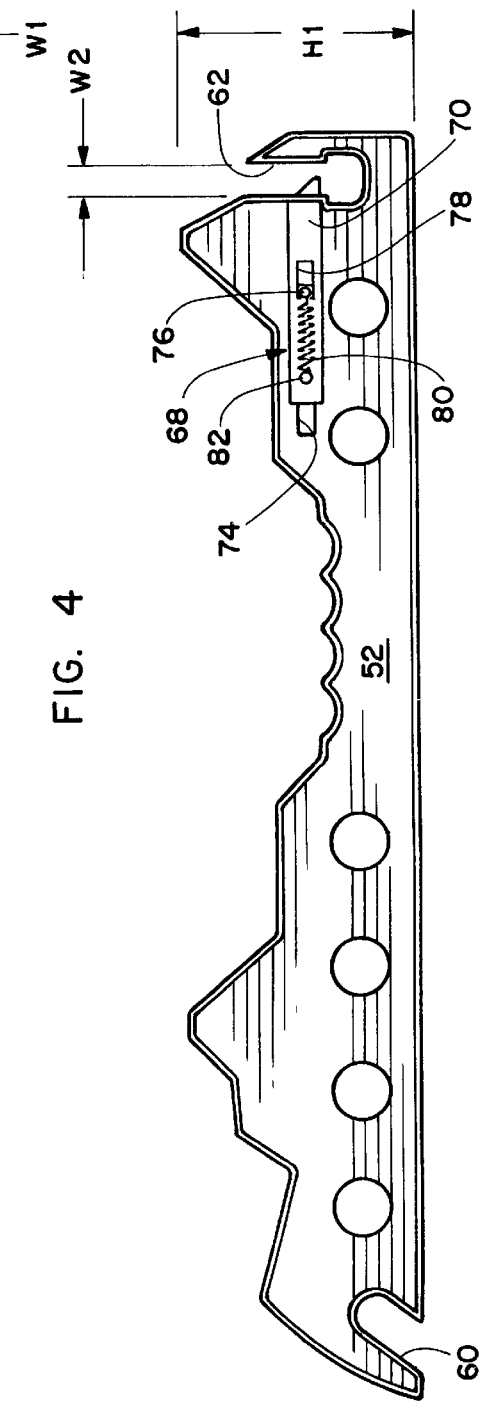

REMOVABLE SUPPORT STRUT FOR FOLDABLE SPORTS UTILITY VEHICLE SEAT

BACKGROUND OF THE INVENTION

The invention relates to sports utility vehicles and more specifically to a removable support strut for bracing the rear seat of the sports utility vehicle when the seat portion is tilted vertically.

Sports utility vehicles such as the current Ford Expedition and the Lincoln Navigator have an extremely small cargo space behind the rear seat of the vehicles. When the rear seat is in position for receiving passengers, the cargo space is approximately the width of a six pack of soft drinks and it provides very little space for transporting groceries, etc.

The rear seat of these sports utility vehicles are designed so that the back portion of the seat can fold forwardly flat onto the seat portion. Secured to the bottom of the seat portion is a pivot assembly that allows the seat portion to be rotated up into a vertical position. What the automobile manufacturers failed to do was to provide sufficient structure in order to lock the seat portion in its vertical position. The weight of the seat (the seat portion and the back portion) is heavy and if it were to fall backwards onto a child it could cause serious injury to the child. Likewise, it could also damage any stored items, such as groceries or other fragile packages stored in the cargo space.

It is an object of the invention to provide a novel removable support strut that can work in conjunction with existing structure in the floor of the cargo space and also with the pivot assembly secured to the bottom of the seat portion.

It is another object of the invention to provide a novel removable support strut that can be quickly and easily installed and removed.

It is another object of the invention to provide a novel removable support strut for the foldable vehicle seat of a sports utility vehicle that is lightweight and also compact for storage purposes.

It is an additional object of the invention to provide a novel removable support strut for the foldable seat of a sports utility vehicle that is economical to manufacture and market.

It is an additional object of the invention to provide a novel removable support strut for the foldable seat of a sports utility vehicle that will provide a positive locking structure thereby preventing the seat portion from pivoting rearwardly and injuring either passengers or goods.

SUMMARY OF THE INVENTION

The removable support strut for the foldable rear seat of a sports utility vehicle is preferably made of number 14 gauge sheet metal and then nylon coated. Weight reduction apertures are formed in the support strut throughout its length to make it relatively light. It is fairly compact since it is less than 24 inches long and approximately 4 inches wide at its widest part. The only movable part is the latch of the latch assembly.

The rear end of the strut member has a seat-anchor rod slot formed in its top edge adjacent its rear end. The slot makes an acute angle with the top edge of the strut member and this in combination with the convex rear end of the strut member provide a unique structure for connecting the strut member to the seat anchor rod mounted under the floor in the cargo space area.

The rear seat of a sports utility vehicle such as the Lincoln Navigator and the Ford Expedition has been designed so that it can be moved from a horizontal position to a vertical position. Secured to the bottom of the seat portion of the rear seat are two laterally spaced pivot assemblies. The front end of these pivot assemblies is mounted on a laterally extending shaft under the floor of the cargo space area. The rear end of the transversely extending pivot assemblies each have a support arm that is connected to a handle. When the seat portion is rotated rearwardly to its horizontal position, a groove in the bottom of the respective support arms travels over the transversely extending seat-anchor rod mounted beneath the floor of the cargo space. Further rearward rotation of the handle locks the seat portion and prevents its unintentional upward movement. Extending between the respective pivot assemblies is a tie-rod whose function will be described later.

The manner in which the strut support is installed will now be described. When the seat portion of the rear seat is in its horizontal position, the transversely extending handle connected to the respective pivot assemblies would be lifted upwardly thereby releasing the laterally spaced support arms from the seat-anchor rod. Continued movement of the seat portion of the rear seat would take it to a vertical position. The rear end of the support strut is then inverted and lowered over the seat anchor rod as it enters the seat-anchor rod slot of the support strut. The front end of the support strut is then pivoted forwardly approximately ninety degrees until the latched slot at the front end of the support strut passes over the transversely extending tie-rod and it is firmly latched in position. The opening surrounding the seat-anchor rod has a specially designed contour of annular vertical and horizontal surfaces. The bottom surface of the support strut has a mating structure that positively positions the support strut at the precise angle at which it is locked. The seat-anchor rod slot is close to the rear end of the support strut and it also has an arcuate convex curvature which allows the bottom of the support strut to be pivoted around the seat-anchor rod and not hang up on any structure under the cargo space floor.

The top end of the latch slot has a forward and a rearward nesting shoulder. If a child should accidently pull the latch member rearwardly, the tie-rod of the seat portion will still remain wedged into the rear nesting shoulder at the top of the latch slot. Only by the child pushing the seat portion forwardly could they possibly remove the upper end of the support strut from the tie-rod. Also in the case of the vehicle being hit from the rear, any movement of the seat portion forwardly keeps the tie-rod captured in the front nesting shoulder at the top of the latch slot. The rear end of the support strut is positively captured in the annular recess walls surrounding the seat-anchor rod at the rear of the cargo space floor.

The support strut has been designed to be easily and quickly removed. Also it requires no mechanical hardware connectors and therefore it doesn't impede removal of the rear seat if so desired.

DESCRIPTION OF THE DRAWINGS

FIG. 3 is a right side elevation view of the novel removable support strut;

FIG. 4 is a bottom plan view of the removable support strut; and

FIG. 5 is a left side elevation view of the removable support strut showing it in an inverted position.

DESCRIPTION OF THE PREFERRED EMBODIMENT

The removable support strut for the foldable rear seat of a sports utility vehicle will now be described by referring to FIGS. 1–5 of the drawings. The support strut is generally designated numeral 10.

Figure 1:
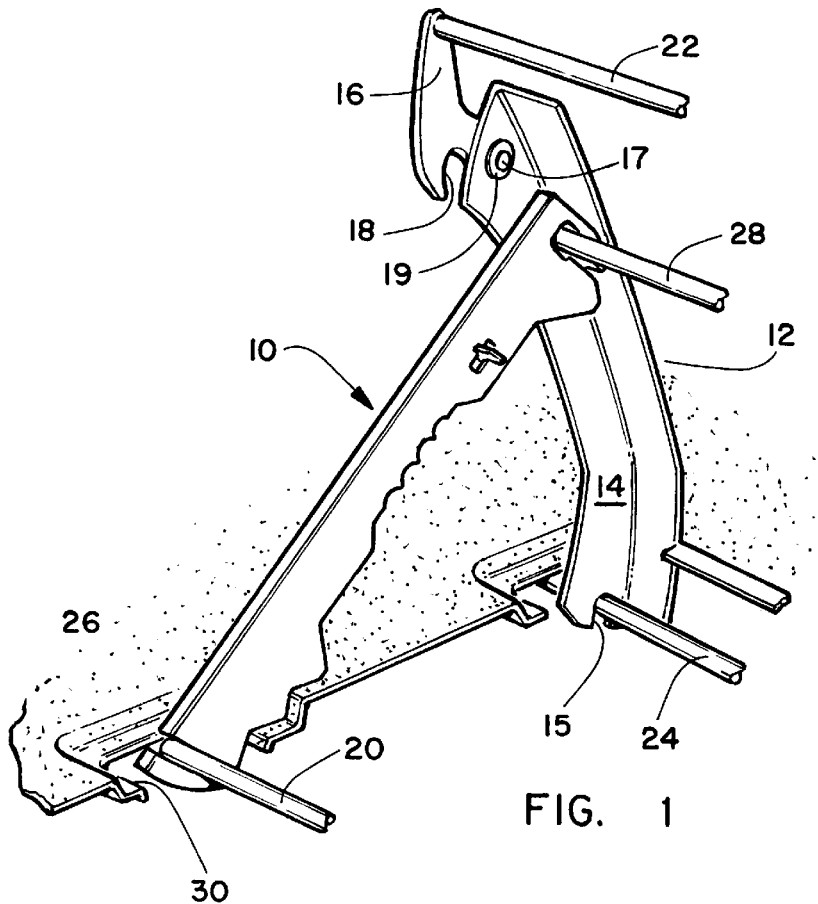
FIG. 1 is a front perspective view illustrating the manner in which the removable support strut is installed in the cargo space area of a sports utility vehicle.
Figure 2:
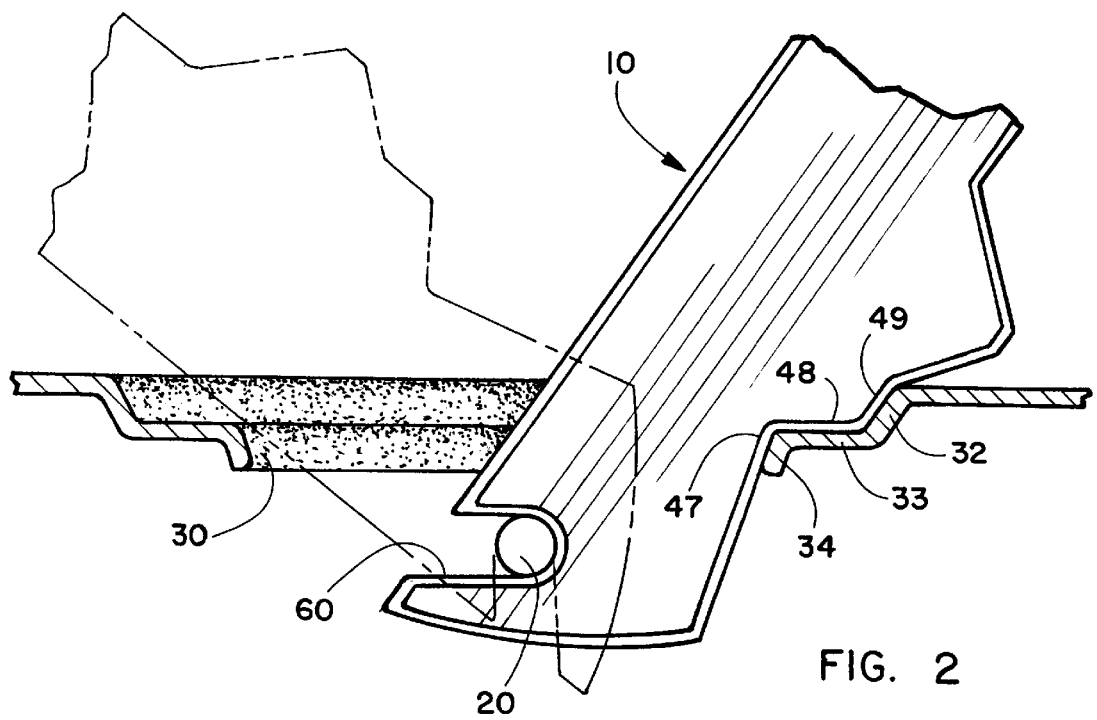
FIG. 2 is a partial side elevation view illustrating phantom lines; the initial position of the rear end of the support strut when it is first installed and also showing its locked position.

In FIG. 1 support strut 10 is illustrated in the position that locks the seat portion of the rear seat in its upright position. There are two laterally spaced pivot assemblies 12 (only one is shown) that are rigidly connected to the bottom surface of the seat secured to the bottom surface of the seat portion (not shown) of the rear seat of the sports utility vehicle. Each pivot assembly has a bracket 14 having a support arm 16 pivotally secured on a pin 17. Support arms 16 have a groove 18 at their bottom end that captures the seat-anchor rod 20 when the seat portion is rotated rearwardly to its horizontal position. At that time, the transversely extending handle 22 whose opposite ends are connected to the respective support arms 16 is pulled rearwardly thereby locking the seat portion in its horizontal position. Each bracket 14 has a groove 15 in its forward end allowing pivot assembly 12 to pivot around shaft 24 that extends transversely underneath the cargo space floor 26. A transversely extending tie-rod 28 also connects the laterally spaced brackets 14.

Seat-anchor rod 20 is visible in an opening 30 in cargo space floor 26. Surrounding opening 30 is the structure illustrated in FIG. 2. It consists of an annular wall 32, an annular horizontal panel 33 and an annular flange 34. The manner in which this structure cooperates with the bottom edge of the support strut is clearly shown in FIG. 2. The phantom lines show how the rear end of support strut 10 is initially engaged with seat-anchor rod 20 and then pivoted forwardly into its latched position.

The specific structure of support strut 10 is best described by referring to FIGS. 3–5 of the drawings. Support strut member 10 has a top edge 40, a bottom edge 41, a front end 42, and a rear end 43. It also has a longitudinally extending X-axis. A plurality of finger gripping recesses 45 are formed in bottom edge 41 intermediate its front and rear ends. Planar surfaces 47, 48 and 49 mate with the respective surfaces 34, 33 and 32 of the cargo space floor recess. Strut member 10 has a right side 50 and a left side 52 and there are a plurality of weight reduction apertures 54 spaced along its length.

A seat-anchor rod slot 60 is formed in top edge 40 adjacent rear end 43. Seat-anchor rod slot 60 has a K-axis that makes an acute angle A with top edge 40. A cam surface 63 first contacts washer 19 of pin 17 as the support strut member 10 pivots forward toward tie-rod 28. Then tie-rod 28 contacts cam surface 65 as it is directed into latch slot 62.

A latch slot 62 is formed in bottom edge 41 adjacent front end 42. Latch slot has a L-axis that makes a 90 degree angle B with top edge 40. Latch slot 62 has a forward nesting shoulder 64. A rear nesting shoulder 66 is also formed at the top end of latch slot 62. Latch assembly 68 has a latch member 70 having a finger 72 extending transversely from its rear end. Finger 72 passes perpendicularly through slot 74. A pin 76 is connected to the surface of left side 52 and it extends through a slot 78 in latch member 70. A spring member 80 is secured to pin 76 and also to pin 82 that is extending transversely from latch member 70.

Strut brace 10 has a length L1 that is approximately 23 inches long. It has a maximum height H1 that is approximately 4 inches. Strut 10 has a width W1 that is approximately ½ inch and latch slot 62 has a width W2 that is approximately ½ inch.

What is claimed is:

1. A removable support strut for bracing the rear seat of a sports utility vehicle when the seat is tilted vertically comprising:

an elongated support strut member having a left side, a right side, a top edge, a bottom edge, a front end and a rear end;

a seat anchor rod slot is formed in said top edge of said strut member adjacent said rear end; and latching means adjacent said front end of said support strut member for removably engaging a transversely extending tie-rod that would form part of a pivot assembly secured to the bottom of a rear seat in a sports utility vehicle when the seat is tilted vertically; said latching means comprises a latch slot in said bottom edge of said support strut member adjacent said front end; and a latch assembly.

2. A removable support strut for bracing the rear seat of a sports utility vehicle as recited in claim 1 further comprising finger gripping recesses in said bottom edge of said strut member.

3. A removable support strut for bracing the rear seat of a sports utility vehicle as recited in claim 1 further comprising a plurality of weight reduction apertures formed in said strut member throughout its length.

4. A removable support strut for bracing the rear seat of a sports utility vehicle as recited in claim 1 wherein said right side of said strut member has a substantially planar surface.

5. A removable support strut for bracing the rear seat of a sports utility vehicle as recited in claim 4 wherein said rear end of said strut member has a convex curvature.

6. A removable support strut for bracing the rear seat of a sports utility vehicle as recited in claim 1 wherein said strut member has a longitudinally extending X-axis.

* * * * *